(12) United States Patent
Gahres et al.

(10) Patent No.: US 11,503,770 B2
(45) Date of Patent: Nov. 22, 2022

(54) AGRICULTURAL BALER WITH LOOPED ROLL

(71) Applicant: CNH Industrial America LLC, New Holland, PA (US)

(72) Inventors: Jason T. Gahres, Robesonia, PA (US); Todd F. Hertzler, Gordonville, PA (US); John R. McClure, New Holland, PA (US); Luke W. Morrie, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 663 days.

(21) Appl. No.: 16/579,165

(22) Filed: Sep. 23, 2019

(65) Prior Publication Data

US 2021/0084824 A1    Mar. 25, 2021

(51) Int. Cl.
*A01F 15/08* (2006.01)
*F16C 13/00* (2006.01)

(52) U.S. Cl.
CPC .......... *A01F 15/0825* (2013.01); *F16C 13/00* (2013.01)

(58) Field of Classification Search
CPC .............................. A01F 15/0825; F16C 13/00
USPC ...................................... 492/30, 35
See application file for complete search history.

(56) References Cited

U.S. PATENT DOCUMENTS

| | | | | |
|---|---|---|---|---|
| 1,568,401 | A * | 1/1926 | Griffith | D21F 1/36 26/105 |
| 1,802,003 | A * | 4/1931 | Connelly | B41N 1/20 101/401.1 |
| 2,534,685 | A * | 12/1950 | Shrader | A01D 45/025 460/29 |
| 2,569,175 | A * | 9/1951 | Karlsson | A01D 45/025 492/35 |
| 2,755,036 | A * | 7/1956 | Terho | B65H 75/18 264/16 |
| 4,047,274 | A * | 9/1977 | Lehmann | B22D 11/1287 492/1 |
| 5,181,461 | A * | 1/1993 | Viaud | A01F 15/106 100/88 |
| 5,191,833 | A * | 3/1993 | Clevenger, Jr. | A01F 15/07 100/88 |
| 5,941,168 | A * | 8/1999 | Kluver | A01F 15/07 474/271 |
| 10,974,919 | B2 * | 4/2021 | Patrick | B65H 23/038 |
| 2008/0120957 | A1 | 5/2008 | Delphigue et al. | |
| 2008/0184691 | A1 | 8/2008 | Horchler et al. | |

* cited by examiner

*Primary Examiner* — Jason L Vaughan
(74) *Attorney, Agent, or Firm* — Patrick Sheldrake; Peter Zacharias

(57) ABSTRACT

A roll for an agricultural baler includes an interior tube and an exterior tube surrounding and connected to the interior tube. The exterior tube has an exterior surface and a plurality of loops extending from the exterior surface of the exterior tube.

18 Claims, 7 Drawing Sheets

US 11,503,770 B2

AGRICULTURAL BALER WITH LOOPED ROLL

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, the cut crop material is gathered at the front of the baler from along the ground, onto a pickup assembly, and introduced into a baling chamber within the baler. Inside, the cut crop is rolled up into a predetermined size. A conventional baling chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Round balers are generally provided with a sledge assembly to assist in rolling gathered material into a bale and forming the core of the bale. Sledge assemblies may include, for example, a pivot roll, a stripper roll, and a follower roll. To reduce the risk of crop that accumulates behind the belts in the follower roll area from on the rolls, a dual follower roll configuration may be used that has a smooth follower roll in front and a looped follower roll behind the smooth follower roll.

While such balers are effective, the tendency to increase the width of the baling chamber to produce wider bales has increased the fatigue on certain elements of the baler. In some scenarios, certain elements must be completely resized to account for the additional width, which makes retrofitting the elements to existing balers difficult.

What is needed in the art is a baler that can address at some of the previously described issues with known balers.

SUMMARY OF THE INVENTION

Exemplary embodiments disclosed herein provide a roll, such as a follower roll, that can minimize, or eliminate, welds to the outer diameter of the roll to avoid failing in rotational bending fatigue.

In some exemplary embodiments provided according to the present disclosure, a roll for an agricultural baler includes an interior tube, and an exterior tube surrounding and connected to the interior tube. The exterior tube has an exterior surface and a plurality of loops extending from the exterior surface of the exterior tube.

In some exemplary embodiments provided according to the present disclosure, a roll for an agricultural baler includes: a tube having an exterior surface; a first sheet of at least partially formed loops that surrounds the exterior surface; and a second sheet of at least partially formed loops that surrounds the exterior surface and is connected to the first sheet to form a plurality of loops that surround the exterior surface.

In some exemplary embodiments provided according to the present disclosure, a roll for an agricultural baler includes: an interior tube having an exterior surface; and an exterior tube surrounding and connected to the exterior surface, the exterior roll including a spine and a plurality of loops connected to the spine and wrapping around the exterior surface of the interior roll.

One possible advantage that may be realized by exemplary embodiments disclosed herein is that the roll can be formed with few, if any, weld points, which reduces or eliminates weld stress concentration in the roll so the roll can be provided with greater lengths without increasing the outer diameter.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
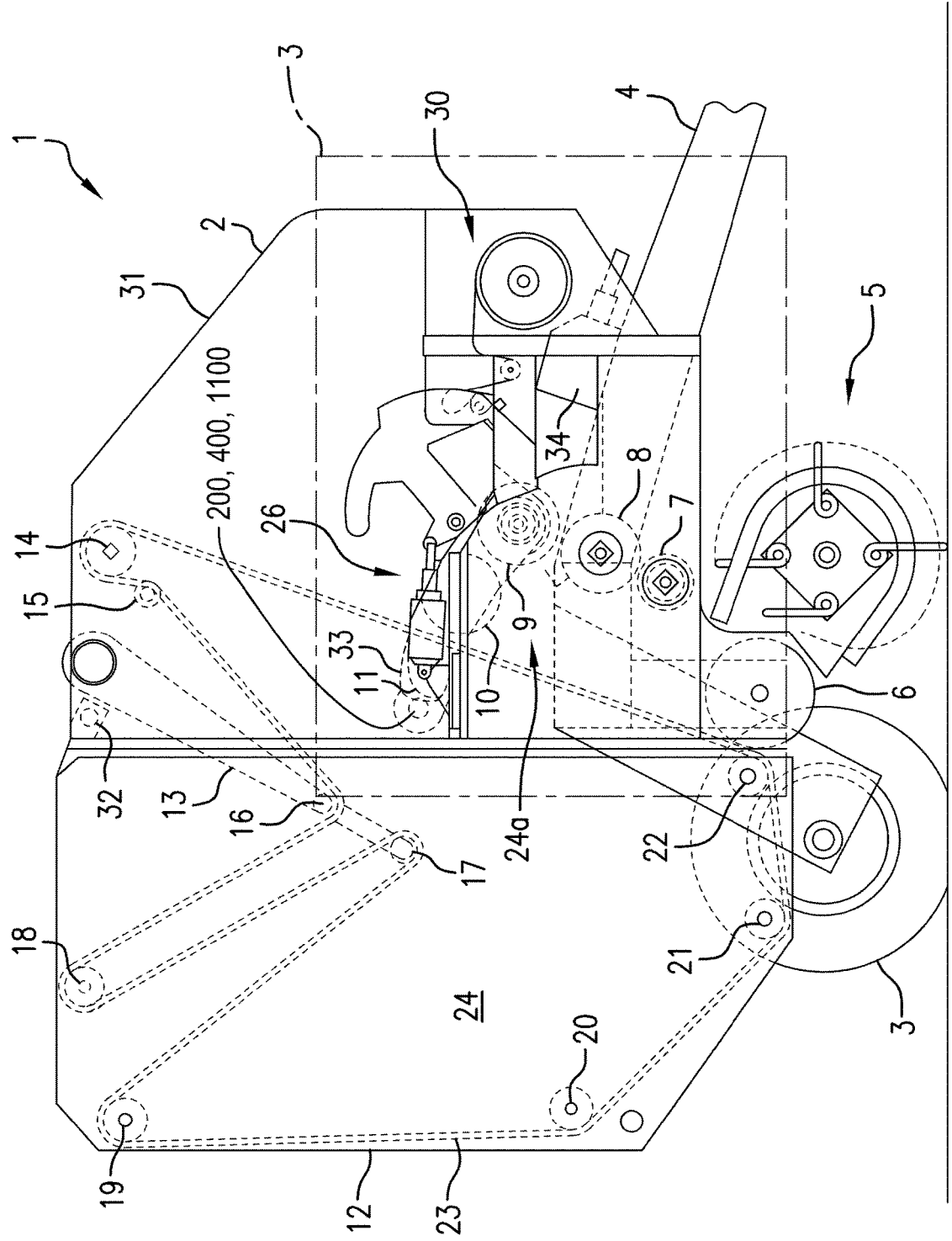
FIG. 1 illustrates a sectional view of an exemplary embodiment of an agricultural baler including a roll, provided in accordance with the present disclosure.

FIG. 1 illustrates an agricultural baler 1, illustrated as a round baler, with a baling chamber 24a ready to receive crop material. The round baler 1 is attached to a tractor by a tongue 4. Rotational power from the tractor's power-take-off shaft is transmitted to a gearbox 34 via a drive shaft. This is the source of power to operate the round baler. It is also possible that a hydraulic motor and pump arrangement may be used.

The round baler 1 has a chassis 2 supported by a pair of wheels (only one shown) 3. A pickup 5 is positioned in front of the wheels 3. The baling chamber 24a is defined by a pair of opposing baling chamber sidewalls 24 and a series of rubber belts defining an apron 23. Further defining the baling chamber 24a is a floor roll 6, a starter roll 7 and a stationary dimple roll 8 and a sledge assembly 26. The baling chamber 24a has a tailgate 12 that pivots about a tailgate pivot 32 to separate the tailgate 12 from a front portion 31 of the baler 1. The sledge assembly 26 includes a pair of sledge arms 33 between which rotatably extend a lower, pivot roll 9, a middle, stripper roll 10, an upper, first follower roll 11, and a second follower roll 200, 400, 1100 placed behind the first follower roll 11. The first follower roll 11 may be a smooth roll and the second follower roll 200, 400, 1100 may be a looped roll, as will be described further herein. The sledge assembly 26 is rotatable about an axis which coincides with the axis of the pivot roll 9.

The series of rubber belts or apron 23 encircle the sledge follower roll 11, a drive roll 14, a backwrap roll 15, a front serpentine roll 16, a rear serpentine roll 17, a top/front tailgate idler roll 18, a top/rear tailgate idler roll 19, a middle tailgate idler roll 20, a bottom tailgate idler roll 21 and a nose idler roll 22. The length of the apron 23 is adjusted by a pivoting serpentine take up arm 13. The serpentine take up arm 13 rotates clock wise as the crop material enters the baling chamber 24a and increases the length of the apron 23 as the size of a bale increases.

Generally, the tractor pulls the baler 1 over a windrow of previously cut crop. The pickup 5 inserts the crop between the floor roll 6 and the starter roll 7 into the baling chamber 24a. As more crop material enters the bale chamber 24a, the serpentine take up arm 14 and sledge assembly 26 rotate clockwise to allow additional crop material to enter the chamber 24a while ensuring that proper pressure is maintained on the bale. When the bale chamber 24a is full, a bale wrapping system 30 engages and wraps the bale. Once the bale is wrapped, the tailgate 12 raises and ejects the bale from the baling chamber 24a and away from the round baler 1 and tractor.

As baling chambers become wider, associated rolls, such as follower rolls, have become longer to span the entire width of the chamber. In dual follower rolls assemblies, looped follower rolls rotate in conjunction with smooth follower rolls to reduce the risk of crop material wrapping around the rolls. Known follower rolls with loops are generally formed by welding loop sections to the outer diameter of a cylinder. While the welds are effective to secure the loops to the cylinder, welding the loops to the cylinder tends to weaken material of the cylinder at the weld spots. As the rolls increase in length, such as to 5 feet (1.5 meters) or longer, the welds cause a stress concentration in the roll that will cause the roll to fail in rotational bending fatigue, regardless of a thickness of the cylinder wall. One way that has been proposed to solve this issue is by increasing an outer diameter of the roll to be greater than 4.5 inches (~11.5 cm), but this is not an attractive solution due to the complexity in common associated parts.

Figure 2:
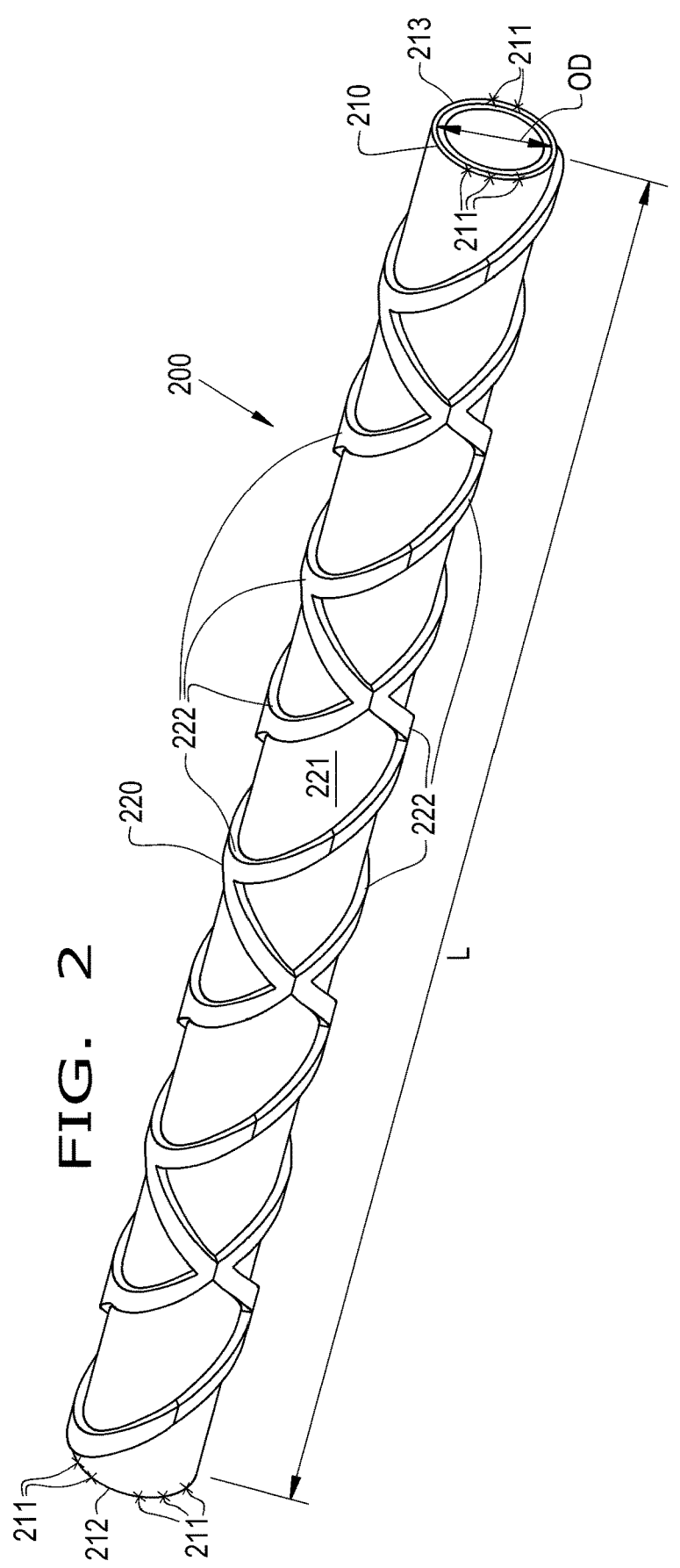
FIG. 2 is a perspective view of an exemplary embodiment of a roll including an interior tube and an exterior tube, provided in accordance with the present disclosure.

To address some of the previously described issues, and referring now to FIG. 2, the roll 200 includes an interior tube 210 and an exterior tube 220 surrounding and connected to the interior tube 210. While the roll 200 and rolls 400 and 1100 are previously described as a "second follower roll," it should be appreciated that the roll 200 and rolls 400 and 1100 may be used at different locations in the agricultural baler 1. The interior tube 210 may be, for example, a smooth follower roll that has a length L of at least 5 feet and an outer diameter OD of no more than 4.5 inches. In some embodiments, the interior tube 210 has a length of at least 1.15 m and an outer diameter of at least 8.8 cm. Other dimensions are also possible, such as a length of 4 feet and an outer diameter of 3.5 inches or a length of 6 feet and an outer diameter of 5.5 inches. Such follower rolls are known, so further description is omitted for brevity. The exterior tube 220, on the other hand, has an exterior surface 221 with loops 222 extending from the exterior surface 221. The loops 222 may, for example, be welded to the exterior surface 221, which may be a thin metal tube having a thickness of up to 0.375 inches. As shown, each of the loops 222 may extend in a helical fashion around the exterior surface 221. The loops 222 may be shaped and spaced to reduce the risk of crop material accumulating on the roll 200 and the follower roll 11 as the roll 200 rotates. It should thus be appreciated that a wide variety of loop shapes, sizes, and layouts may be provided according to the present disclosure.

In some embodiments, the interior tube 210 and the exterior tube 220 are connected together by welds 211 located near ends 212, 213 of the interior tube 210. The welds 211 may be, for example, distanced no more than 5% of the length L of the interior tube 210 from the ends 212, 213 of the interior tube 210. In other words, in some embodiments none of the welds 211 are distanced more than 5% of the length L from one of the ends 212, 213 of the interior tube 210. By concentrating the welds 211 near the ends 212, 213 of the interior tube 210, the stress concentrations at the welds 211 can be limited to regions where the roll 200 is least likely to fail under rotational bending fatigue, providing a roll 200 that can have lengths of at least 5 feet without requiring an outer diameter greater than 4.5 inches.

In some embodiments, the exterior tube 220 is connected to the interior tube 210 by an adhesive. The adhesive may be applied across the entire length L of the interior tube 210 to provide a strong, uniform connection between the tubes 210, 220. Any type of adhesive may be utilized, with exemplary adhesives being epoxies. The interior tube 210 may, for example, be covered with adhesive and then press fit into the exterior tube 220. In some embodiments, the interior tube 210 is press fit into the exterior tube 220 without being covered in adhesive; in such embodiments, the friction between the tubes 210, 220 is sufficient to connect the tubes 210, 220 together. One or both of the tubes 210, 220 can include a fitting feature to prevent relative rotation between the tubes 210, 220. Alternatively or in addition, the tubes 210, 220 can be connected together by brazing. It should thus be appreciated that the tubes 210, 220 can be connected to one in another in a variety of ways that do not require welding.

From the foregoing, it should be appreciated that the roll 200 including tubes 210, 220 can be formed in a way that minimizes, or eliminates, the number and stress concentrations of welds. The welds may be concentrated, for example, near the ends of the tube 210 where there is relatively low bending stress to reduce the risk of the roll 200 failing in bending stress fatigue. Alternatively, the roll 200 can be formed so there is no welding of the exterior tube 220 to the interior tube 210, maintaining the strength of the interior tube 210 while providing the loops 222 on the exterior tube 220. Thus, the roll 200 provided according to the present invention can be utilized as, for example, a looped follower roll with a length of, for example, at least 5 feet and an outer diameter of, for example, no more than 4.5 inches, allowing the roll 200 to be retrofit in many machines. Other combinations of lengths and outer diameters of the roll 200 can also be provided according to the present disclosure that similarly benefit from minimization or elimination of welds between the tubes 210, 220.

Figure 3:
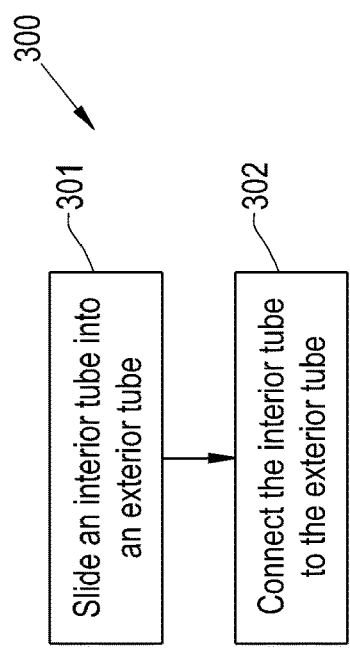
FIG. 3 is a flow chart illustrating an exemplary embodiment of a method of producing a roll for an agricultural baler, provided in accordance with the present disclosure.
Figure 4:
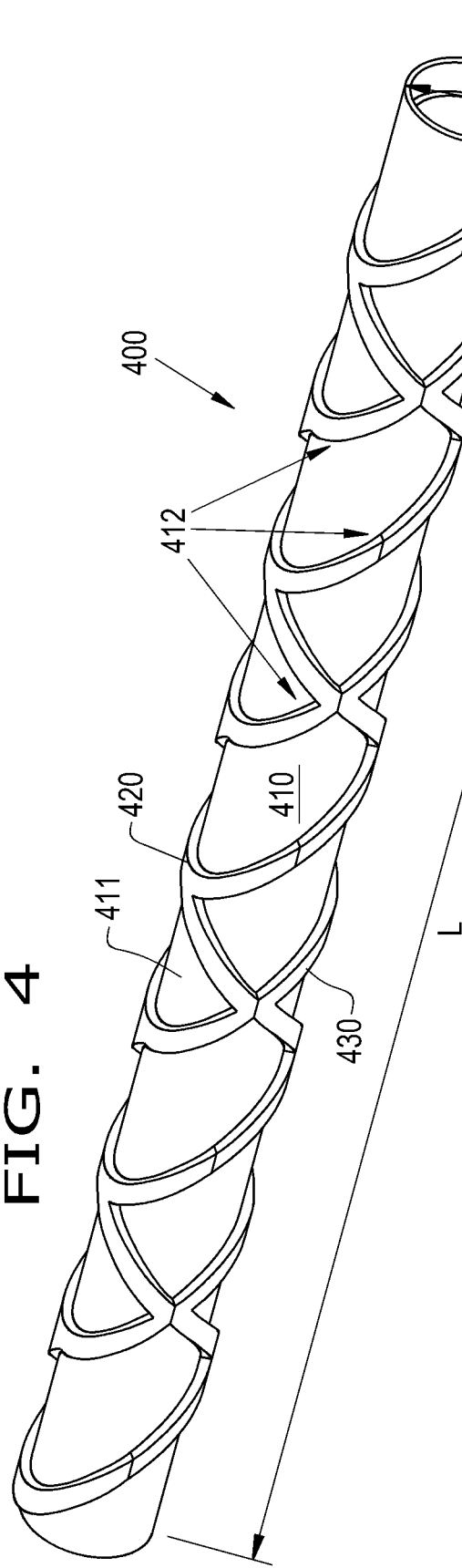
FIG. 4 is a perspective view of an exemplary embodiment of a roll including a tube and a pair of at least partially formed loops surrounding an exterior surface of the roll, provided in accordance with the present disclosure.

Referring now to FIG. 3, an exemplary embodiment of a method 300 of forming a roll 200 for an agricultural baler 1 provided according to the present disclosure is illustrated. The method 300 includes sliding 301 an interior tube 210 into an exterior tube 220 so the exterior tube 220 surrounds the interior tube 210 and connecting 302 the interior tube 210 to the exterior tube 220 to form the roll 200. The exterior tube 220 has an exterior surface 221 with loops 222 extending from the exterior surface 221. In some embodiments, the interior tube 210 is a smooth follower roll that has a length L of at least 5 feet and an outer diameter OD of no more than 4.5 inches. Connecting 302 the tubes 210, 220 may include, for example, welding the tubes 210, 220 together near ends 212, 213 of the interior tube 210, using an adhesive, press fitting and/or brazing the interior tube 210 to the exterior tube 220. It should thus be appreciated that the roll 200 provided according to the present disclosure can be formed in a variety of different ways.

Referring now to FIGS. 4-9, another exemplary embodiment of a roll 400 for an agricultural baler 1 provided according to the present disclosure is illustrated. The roll 400 includes a tube 410, a first sheet 420 of at least partially formed loops and a second sheet 430 of at least partially formed loops. Similar to the previously described interior tube 210, the tube 410 can have a length L of at least 5 feet and an outer diameter OD of no more than 4.5 inches to allow retrofitting of the roll 400. However, it should be appreciated that the length L and the outer diameter OD of the tube 410 can be different values, depending on the application. In some embodiments, the tube 410 has a length of at least 1.15 m and an outer diameter of at least 8.8 cm. Other dimensions are also possible, such as a length of 4 feet and an outer diameter of 3.5 inches or a length of 6 feet and an outer diameter of 5.5 inches.

The first sheet 420 and the second sheet 430 each include a plurality of at least partially formed loops. The sheets 420, 430 each surround an exterior surface 411 of the tube 410 so the loops of the sheets 420, 430 extend from the exterior surface 411. The sheets 420, 430 are connected to each other to form loops 412 that surround the exterior surface 411 and allow the roll 400 to, for example, reduce the risk of crop material accumulating on the roll 400 and the follower roll 11. The sheets 420, 430 may be connected to one another in a variety of ways, as will be described further herein.

Figure 5:
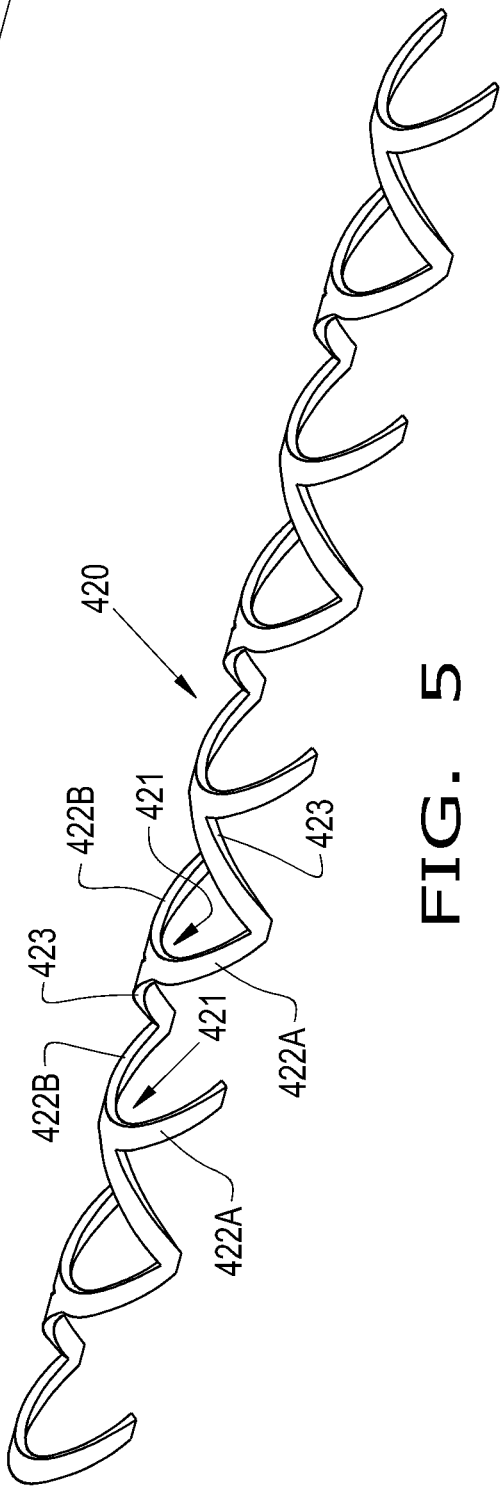
FIG. 5 is a perspective view of one of the sheets illustrated in FIG. 4.
Figure 6:
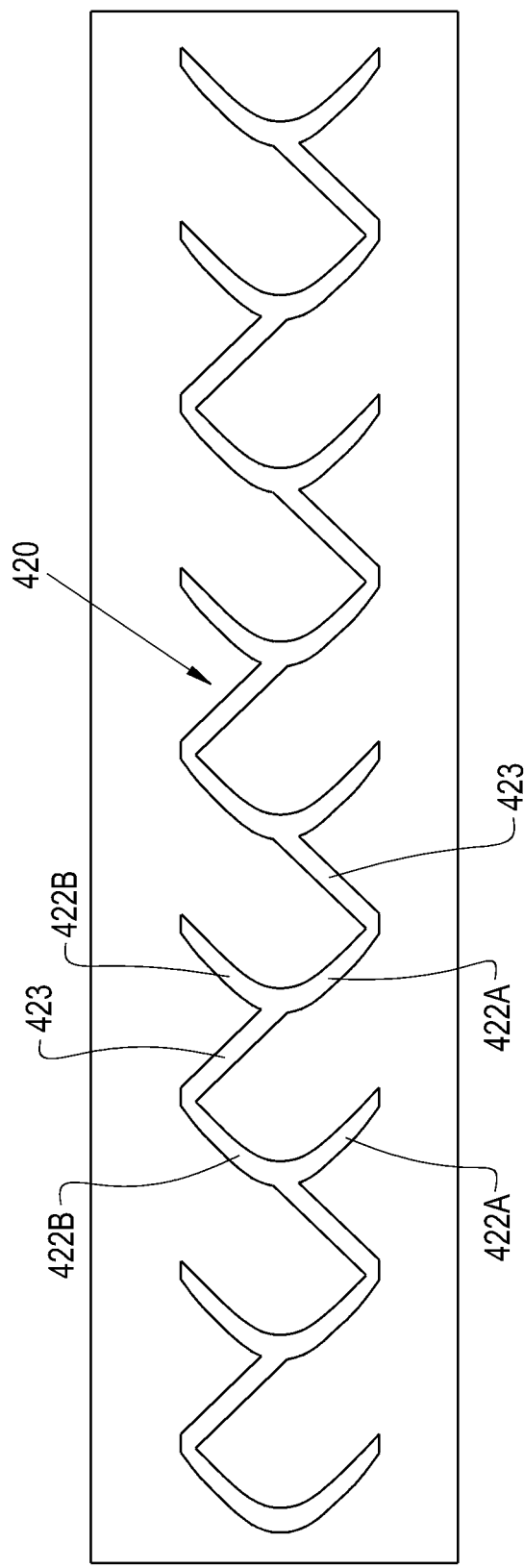
FIG. 6 is a top view of the sheet illustrated in FIGS. 4 and 5.
Figure 7:
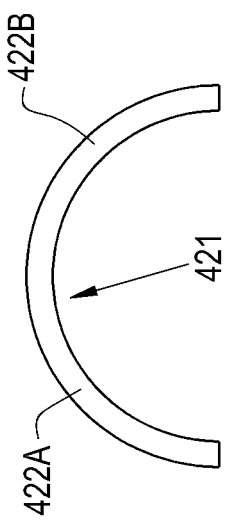
FIG. 7 is an end view of the sheet illustrated in FIGS. 4-6.

FIGS. 5-7 illustrate an exemplary embodiment of the first sheet 420, but it should be appreciated that the second sheet 430 can be formed similarly to the first sheet 420. As illustrated, the sheet 420 may be formed as a series of interconnected half loops 421 each including a pair of struts 422A, 422B. Each of the struts 422A, 422B may be formed to helically curve. In some embodiments, one of the struts 422A, 422B connects the half loop 421 to adjacent half loops 421 via a connecting strut 423 and the other strut 422A, 422B has a free end to connect to the other sheet 430. Connection between the connecting struts 423 and the struts 422A, 422B may alternate between the half loops 421, as best illustrated in FIG. 6. The sheets 420, 430 may each define a semi-cylindrical shape that, when connected together, form a cylindrical shape, which can surround the exterior surface 411 of the tube 410. The semi-cylindrical shape of one of the sheets 420 is best illustrated in FIG. 7.

Figure 8:
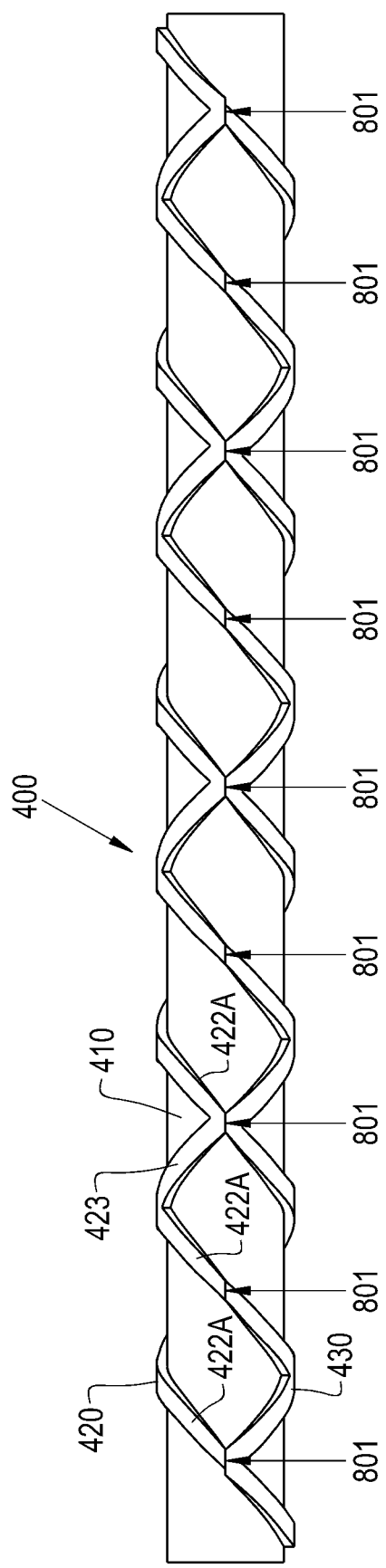
FIG. 8 is a side view of the roll illustrated in FIG. 4 with various welds connecting the sheets together illustrated.

Referring specifically now to FIG. 8, a plurality of welds 801 are illustrated between the first sheet 420 and the second sheet 430. As illustrated, edges of struts 422A, 422B, 423 can be welded together to weld the sheets 420, 430 together. In some embodiments, the sheets 420, 430 are only welded to one another and are not welded to the tube 410. In such embodiments, the welded sheets 420, 430 can be connected to the tube 410 using, for example, an adhesive, by press fitting and/or brazing the sheets 420, 430 to the tube 410. By only welding the sheets 420, 430 together without welding the sheets 420, 430 to the tube 410, the stress concentrations at the welds 801 can be isolated from the tube 410. Isolating the stress concentrations from the tube 410 makes the tube 410 less susceptible to failing due to bending fatigue and allows the tube 410 to be sufficiently rigid to use at lengths of at least 5 feet without having to expand the outer diameter OD to be greater than 4.5 inches.

Figure 9:
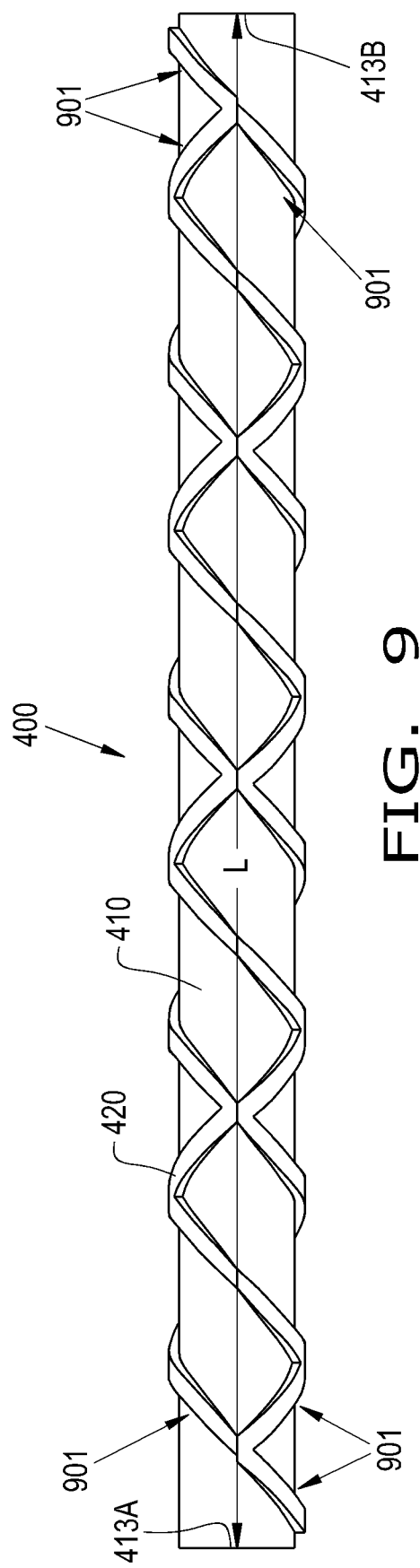
FIG. 9 is a side view of the roll illustrated in FIG. 8 with various welds connecting the sheets to the tube illustrated.

In some embodiments, and referring now to FIG. 9, the sheets 420, 430 are welded to one another and also welded to the tube 410 at tube weld points 901 to connect the sheets 420, 430 to the tube 410. As illustrated, the tube weld points 901 can be located adjacent to ends 413A, 413B of the tube 410 so the tube weld points 901 are located within 5% of a length L of the tube 410 from the ends 413A, 413B. In other words, none of the welds at the tube weld points 901 are distanced by more than 5% of the length L from one of the ends 413A, 413B of the tube 410. The welds at the tube weld points 901 may, for example, follow the edges of the struts 422A, 422B, 423 to securely connect the sheets 420, 430 to the tube 410. Similarly to the previously described roll 200, limiting welding of the sheets 420, 430 to the tube 410 to locations that are adjacent to the ends 413A, 413B of the tube 410 can help preserve strength in the tube 410 and reduce the risk of the tube 410 failing at lengths greater than 5 feet and outer diameters of 4.5 inches or less.

Figure 10:
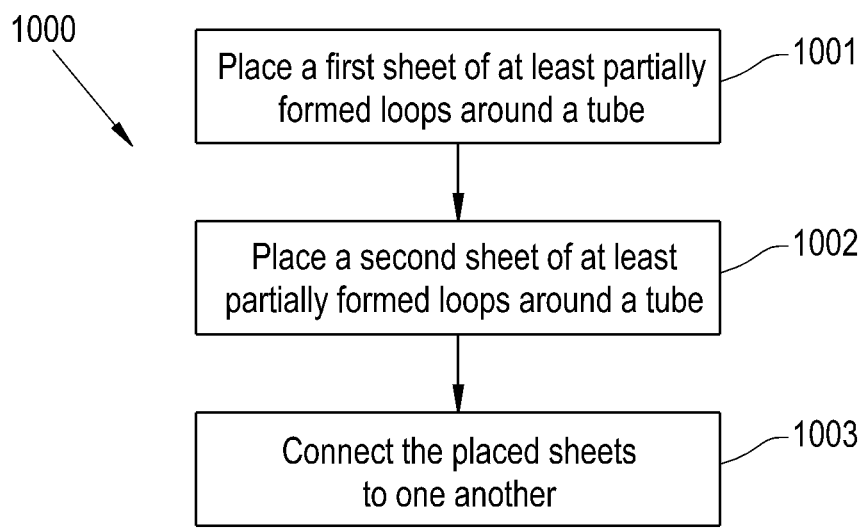
FIG. 10 a flow chart illustrating an exemplary embodiment of a method of producing a roll for an agricultural baler, provided in accordance with the present disclosure.

Referring now to FIG. 10, another exemplary embodiment of a method 1000 of forming a roll 400 for an agricultural baler 1 is illustrated. The method 1000 includes placing 1001 a first sheet 420 of at least partially formed loops around an exterior surface 411 of a tube 410 and placing 1002 a second sheet 430 of at least partially formed loops around the exterior surface 411 of the tube 410. The sheets 420, 430 are placed 1001, 1002 so the sheets 420, 430 surround the exterior surface 411. The placed sheets 420, 430 are connected 1003 to one another to form a plurality of loops 412 that surround the exterior surface 411, forming the roll 400. In some embodiments, the sheets 420, 430 are welded to one another without being welded to the tube 410. The welded sheets 420, 430 may then be connected to the tube 410, for example, by using an adhesive, press fitting, and/or brazing the sheets 420, 430 and the tube 410 together. Alternatively, the sheets 420, 430 may be welded to the tube 410 adjacent to ends 413A, 413B of the tube 410, as previously described. It should thus be appreciated that the roll 400 can be formed in a variety of ways that limit stress concentrations at welds to the tube 410, allowing the roll 400 to be used at greater lengths without needing to increase the outer diameter.

Figure 11:
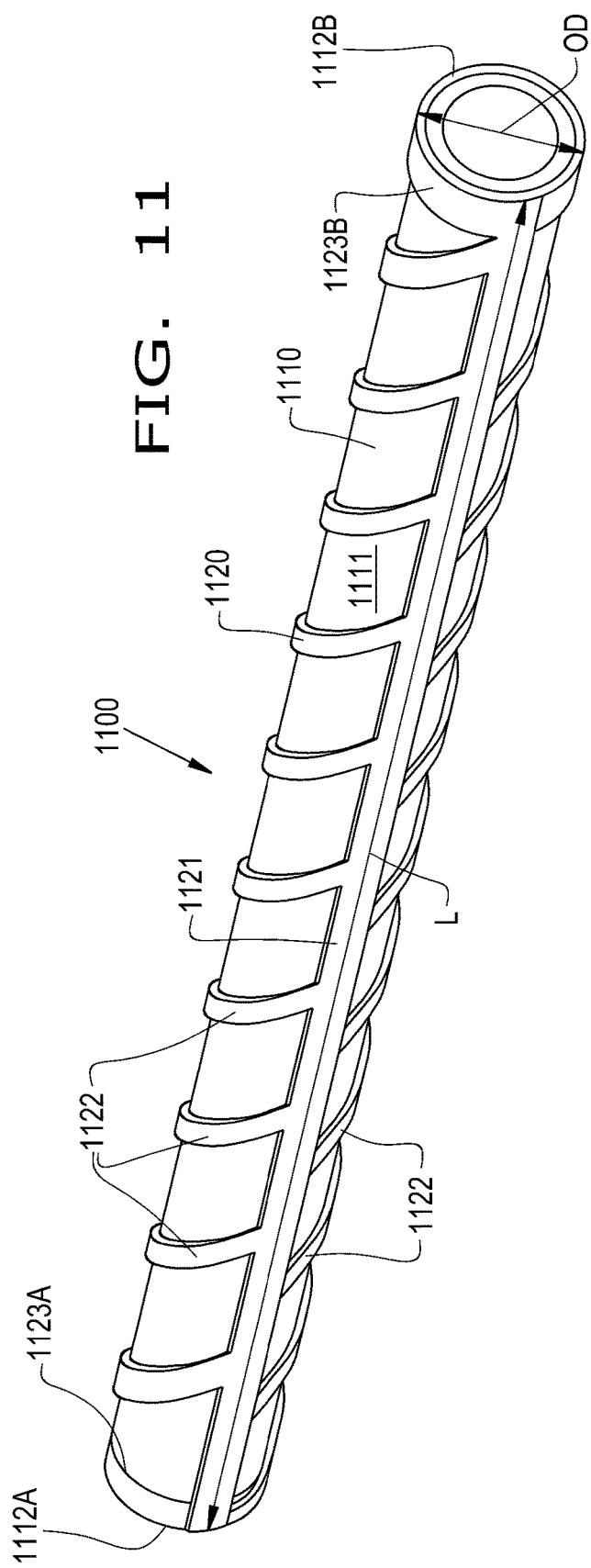
FIG. 11 is a perspective view of another exemplary embodiment of a roll including an interior tube and an exterior tube, provided in accordance with the present disclosure.

Referring now to FIG. 11, yet another exemplary embodiment of a roll 1100 provided according to the present disclosure is illustrated. The roll 1100 includes an interior tube 1110 and an exterior tube 1120 surrounding and connected to the interior tube 1110. As illustrated, the exterior tube 1120 includes a spine 1121 defining a length L of the exterior tube 1120 and a plurality of loops 1122 connected to the spine 1121. Each of the loops 1122 may have a helical shape extending from and connecting to the spine 1121, so the loops 1122 surround an exterior surface 1111 of the interior tube 1110. In this sense, the loops 1122 wrap around the exterior surface 1111 of the interior tube 1110 to form the loops of the roll 1100. Each of the loops 1122 may, for example, define a pair of ends that connect to the spine 1121, with the ends being longitudinally offset from one another due to the helical shape of the loops 1122. The interior tube 1110 may also have a length that is substantially equal to the length L of the exterior tube 1120. In some embodiments, the length L is at least 5 feet and an outer diameter OD of the interior tube 1110 is no more than 4.5 inches, similar to previously described rolls 200, 400. However, it should be appreciated that the length L and the outer diameter OD of the interior tube 1110 can be different values, depending on the application. In some embodiments, the interior tube 1110 has a length of at least 1.15 m and an outer diameter of at least 8.8 cm. Other dimensions are also possible, such as a length of 4 feet and an outer diameter of 3.5 inches or a length of 6 feet and an outer diameter of 5.5 inches.

The exterior tube 1120 may be connected to the interior tube 1110 in a variety of ways. In some embodiments, the exterior tube 1120 is connected to the interior tube 1110 without welding by, e.g., using an adhesive to connect the tubes 1110, 1120, press fitting the exterior tube 1120 to the interior tube 1110, and/or brazing the tubes 1110, 1120 together. Similar to the previously described rolls 200, 400, eliminating the use of welds to connect the tubes 1110, 1120 together provides a looped roll 1100 that does not have stress concentrations at welds, which can provide the roll 1100 with the strength needed to operate at lengths of at least 5 feet without increasing the outer diameter past 4.5 inches.

In some embodiments, the exterior tube 1120 is welded to the interior tube 1110 adjacent to ends 1112A, 1112B of the interior tube 1110. The exterior tube 1120 may, for example, include a welding ring 1123A, 1123B at each respective end of the exterior tube 1120 that can be welded to the interior tube 1110. The welding rings 1123A, 1123B may be a partial circular shape defining a partial circumference, as illustrated, or may be a full circular shape defining a full circumference. The welding rings 1123A, 1123B connect to the spine 1121 and thus connect the spine 1121 and loops 1122 to the interior tube 1110. In some embodiments, the welding rings 1123A, 1123B are welded across their entirety to interior tube 1110 and are distanced no more than 5% of the length of the interior tube 1110 from one of the ends 1112A, 1112B of the interior tube 1110. By limiting welding of the rings 1123A, 1123B to regions that are adjacent to the ends 1112A, 1112B of the interior tube 1110, the associated problems with welding the exterior tube 1120 to the interior tube 1110 may be largely avoided. It should thus be appreciated that the exterior tube 1120 can be welded to the interior tube 1110 in a manner that reduces the risk of the roll 1100 failing due to stress concentrations at welds.

The exterior tube 1120 may be formed in a variety of ways. In some embodiments, a base tube is provided that is cut to form voids, with the voids resulting in formation of the spine 1121, loops 1122, and rings 1123A, 1123B. The base tube may be cut, for example, by a laser to precisely form the voids. Alternatively, the base tube can be slit. In some embodiments, the loops 1122 and the welding rings 1123A, 1123B are preformed and welded or otherwise connected to the spine 1121 to form the exterior tube 1120. It should thus be appreciated that the exterior tube 1120 can be formed in a variety of ways according to the present disclosure.

Figure 12:
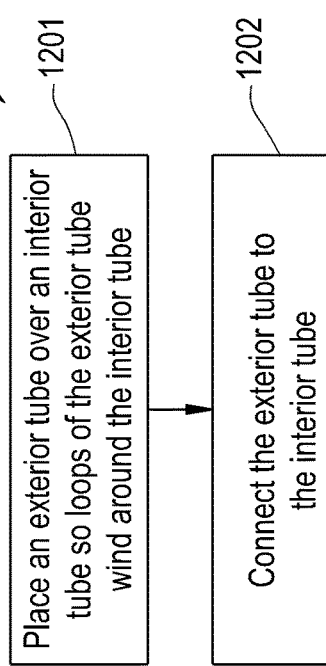
FIG. 12 is a flow chart illustrating an exemplary embodiment of a method of producing a roll for an agricultural baler, provided in accordance with the present disclosure.

Referring now to FIG. 12, an exemplary embodiment of a method 1200 of forming a roll 1100 for an agricultural baler 1 provided according to the present disclosure is illustrated. The method 1200 includes placing 1201 an exterior tube 1120 over an interior tube 1110 so loops 1122 of the exterior tube 1120 wind around an exterior surface 1111 of the interior tube 1110. The loops 1122 are connected to a spine 1121 of the exterior tube 1120. The exterior tube 1120 is connected 1202 to the interior tube 1110, forming the roll 1100. In some embodiments, the exterior tube 1120 is connected 1202 to the interior tube 1110 by press fitting the tubes 1110, 1120 together, with or without using an adhesive and/or brazing the tubes 1110, 1120. The tubes 1110, 1120 may also be connected 1202 together by welding. The exterior tube 1120 may have a pair of welding rings 1123A, 1123B that are connected to the spine 1121 and each welded adjacent to a respective end 1112A, 1112B of the interior tube 1110. It should thus be appreciated that the method 1200 provided according to the present disclosure can minimize or eliminate the number of welds used to form the roll 1100.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A roll for an agricultural baler, comprising:
   an interior tube; and
   an exterior tube surrounding and connected to the interior tube, the exterior tube comprising an exterior surface and a plurality of loops extending from the exterior surface of the exterior tube, wherein the interior tube defines a length and comprises a pair of ends and the exterior tube is connected to the interior tube by a plurality of welds, wherein none of the welds are distanced by more than 5% of the length from one of the ends of the interior tube.

2. The roll of claim 1, wherein the interior tube and the exterior tube each define a length of at least 5 feet.

3. The roll of claim 2, wherein the interior tube defines an outer diameter that is no more than 4.5 inches.

4. The roll of claim 1, wherein the exterior tube is additionally connected to the interior tube by an adhesive.

5. The roll of claim 1, wherein the exterior tube has a thickness of up to 0.375 inches.

6. The roll of claim 1, wherein the loops are welded to the exterior tube.

7. The roll of claim 6, wherein the interior tube is also press fit to the exterior tube.

8. A roll for an agricultural baler, comprising:
   a tube comprising an exterior surface;
   a first sheet of at least partially formed loops that surrounds the exterior surface; and
   a second sheet of at least partially formed loops that surrounds the exterior surface and is connected to the first sheet to form a plurality of loops that surround the exterior surface, wherein the tube defines a length and comprises a pair of ends, the first sheet and the second sheet each being connected to the tube by a plurality of welds, wherein none of the welds are distanced by more than 5% of the length from one of the ends of the tube.

9. The roll of claim 8, wherein the tube defines a length of at least 5 feet.

10. The roll of claim 9, wherein the tube defines an outer diameter that is no more than 4.5 inches.

11. The roll of claim 8, wherein the first sheet defines a semi-cylindrical shape and the second sheet defines a semi-cylindrical shape, the first sheet and the second sheet connecting together to form a cylindrical shape that surrounds the exterior surface.

12. The roll of claim 8, wherein the first sheet is connected to the second sheet by an adhesive.

13. The roll of claim 8, wherein the first sheet and the second sheet are welded to one another.

14. A roll for an agricultural baler, comprising:
an interior tube comprising an exterior surface; and
an exterior tube surrounding and connected to the exterior surface, the exterior roll comprising a spine and a plurality of loops connected to the spine and wrapping around the exterior surface of the interior roll, wherein the exterior tube comprises a pair of welding rings that are each connected to the spine and welded adjacent to a respective end of the interior tube.

15. The roll of claim 14, wherein the interior tube and the exterior tube each define a length of at least 5 feet.

16. The roll of claim 15, wherein the interior tube defines an outer diameter that is no more than 4.5 inches.

17. The roll of claim 14, wherein each of the loops comprises a first end connected to the spine and a second end that is connected to the spine and longitudinally offset from the first end.

18. The roll of claim 14, wherein the welding rings are welded across their entirety to the interior tube.

* * * * *